United States Patent [19]

Nagashima et al.

[11] Patent Number: 5,478,383
[45] Date of Patent: Dec. 26, 1995

[54] INK, AND INK-JET RECORDING METHOD AND INSTRUMENT USING THE SAME

[75] Inventors: Akira Nagashima, Tokyo; Shinichi Tochihara, Hadano, both of Japan

[73] Assignee: Canon Kabushiki Kaisha, Tokyo, Japan

[21] Appl. No.: 321,904

[22] Filed: Oct. 12, 1994

[30] Foreign Application Priority Data

Oct. 14, 1993 [JP] Japan ................. 5-257091

[51] Int. Cl.⁶ .................................. C09D 11/02
[52] U.S. Cl. ............ 106/22 H; 106/20 R; 106/23 H
[58] Field of Search ................. 106/20 R, 22 H, 106/23 H

[56] References Cited

U.S. PATENT DOCUMENTS

| | | | |
|---|---|---|---|
| 4,822,419 | 4/1989 | Pepoy et al. | 106/22 H |
| 4,923,515 | 5/1990 | Koike et al. | 106/22 H |
| 5,017,224 | 5/1991 | Tomita et al. | 106/22 H |
| 5,019,164 | 5/1991 | Tomita et al. | 106/22 H |
| 5,061,316 | 10/1991 | Moffatt | 106/22 H |
| 5,078,790 | 1/1992 | Tochihara et al. | 106/20 R |
| 5,080,716 | 1/1992 | Aoki et al. | 106/20 R |
| 5,100,470 | 3/1992 | Hindagolla et al. | 106/22 H |
| 5,131,949 | 6/1992 | Tochihara et al. | 106/20 R |
| 5,135,571 | 8/1992 | Shirota et al. | 106/22 H |
| 5,173,112 | 12/1992 | Matrick et al. | 106/22 H |
| 5,354,469 | 10/1994 | Shimomura et al. | 106/22 H |
| 5,370,731 | 12/1994 | Yamashita et al. | 106/22 H |
| 5,431,722 | 6/1995 | Yamashita et al. | 106/22 H |

FOREIGN PATENT DOCUMENTS

| | | |
|---|---|---|
| 57-057760 | 4/1982 | Japan. |
| 174578 | 7/1989 | Japan. |
| 2-255876 | 10/1990 | Japan. |
| 2-296878 | 12/1990 | Japan. |

*Primary Examiner*—Helene Klemanski
*Attorney, Agent, or Firm*—Fitzpatrick, Cella, Harper & Scinto

[57] ABSTRACT

Disclosed herein is an ink comprising a coloring material and a liquid medium dissolving or dispersing the coloring material therein, wherein the ink contains in combination a compound of the general formula

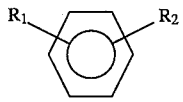

(I)

wherein $R_1$ denotes hydrogen, a nitro group or an amino group, and $R_2$ denotes a carboxyl group, a sulfonic group, a phosphoric group or a salt thereof, and at least one compound selected from the group consisting of primary to tertiary amines, derivatives thereof, and complexes thereof.

22 Claims, 6 Drawing Sheets

INK, AND INK-JET RECORDING METHOD AND INSTRUMENT USING THE SAME

BACKGROUND OF THE INVENTION

1. Field of the Invention

The present invention relates to an ink, in particular, an ink suitable for use in ink-jet recording, and an ink-jet recording method using such an ink and ink-jet recording instruments containing the ink therein.

2. Related Background Art

Inks with greatly varying manners of being composed have been hitherto reported in respect to inks for writing utensils (fountain pens, marking pens, ball-point pens making use of a water-based ink, etc.) and for ink-jet recording. In particular, in recent years, detailed researches and developments has been made on various aspects such as composition and physical properties of inks because of a strong demand for improving the water fastness of images recorded on plain paper such as paper for copying, paper for reporting, notepaper and letter paper, which are commonly used in offices.

For example, Japanese Patent Application Laid-Open Nos. 2-296878, 2-255876 and 57-57760 disclose a method of improving the water fastness of the resulting recorded images.

In such a technique, there is however a potential problem that the water fastness of the recorded image may be insufficient, its quality may be deteriorated, its drying characteristics may be poor, or the stability or clogging resistance of an ink used may be impaired.

SUMMARY OF THE INVENTION

It is accordingly an object of the present invention to provide an ink which can provide recorded images having sufficient water fastness without adversely affecting their quality when conducting recording on so-called plain paper such as acid paper and neutralized paper, commonly used in offices and the like, and permits high-quality printing without the least problem even after stored in a high-temperature environment and also without the problem of clogging, and an ink-jet recording method and instruments using such an ink.

The above object can be achieved by the present invention described below.

According to the present invention, there is thus provided an ink comprising a coloring material and a liquid medium dissolving or dispersing the coloring material therein, wherein the ink contains in combination a compound of the general formula

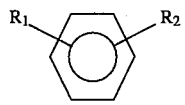

(I)

wherein $R_1$ denotes hydrogen, a nitro group or an amino group, and $R_2$ denotes a carboxyl group, a sulfonic group, a phosphoric group or a salt thereof, and at least one compound selected from the group consisting of primary to tertiary amines, derivatives thereof, and complexes thereof.

According to the present invention, there is also provided an ink-jet recording method comprising ejecting droplets of an ink out of an orifice of a recording head in accordance with a recording signal to conduct recording on a recording material, wherein the ink is the ink described above.

According to the present invention, there is further provided a recording unit comprising an ink container portion with an ink held therein and a head from which the ink is ejected in the form of ink droplets, wherein the ink is the ink described above.

According to the present invention, there is still further provided an ink cartridge comprising an ink container portion with an ink held therein, wherein the ink is the ink described above.

According to the present invention, there is yet still further provided an ink-jet recording apparatus comprising a recording unit having an ink container portion with an ink held therein and a head from which the ink is ejected in the form of ink droplets, wherein the ink is the ink described above.

According to the present invention, there is yet still further provided an ink-jet recording apparatus comprising a recording unit for ejecting an ink in the form of droplets, an ink cartridge having an ink container portion with the ink held therein, and an ink feeder for feeding the ink from the ink cartridge to the recording unit, wherein the ink is the ink described above.

DESCRIPTION OF THE PREFERRED EMBODIMENTS

Figure 1:
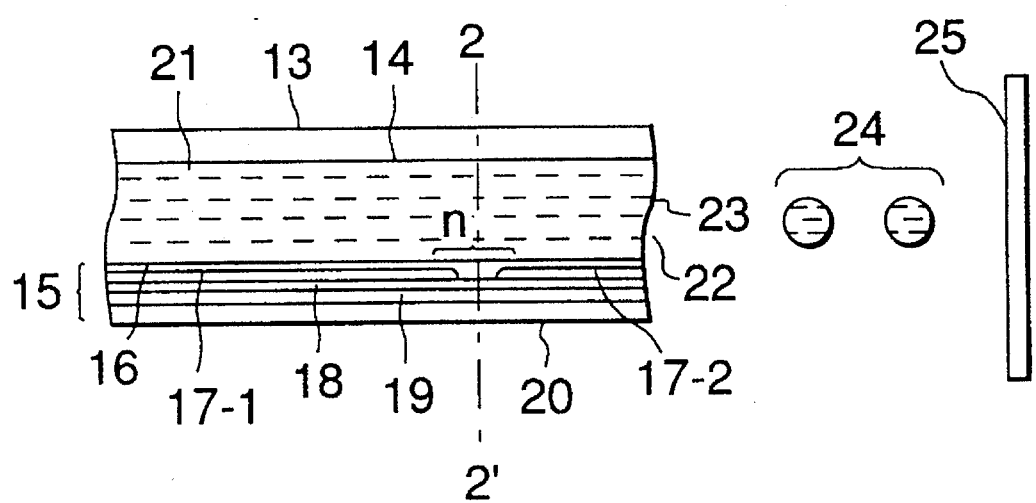
FIG. 1 is a longitudinal cross-sectional view of a head of an ink-jet recording apparatus.

The present invention will hereinafter be described in detail by the following preferred embodiments.

Examples of one compound useful in the practice of the present invention, which is represented by the general formula (I), include nitrobenzenesulfonic acid, nitrobenzoic acid, aminobenzenesulfonic acid, aminobenzoic acid, benzenesulfonic acid, benzoic acid and salts thereof.

Compounds in which $R_1$ in the general formula (I) is a nitro group or an amino group are preferred, with those having a nitro group as $R_1$ being particularly preferred.

On the other hand, compounds in which $R_2$ in the general formula (I) forms a salt are preferred from the viewpoint of improving the water fastness of the resulting print. Those in which $R_2$ forms a salt with a volatile component (for example, ammonia, monoethanolamine, diethanolamine or N-ethyl-diethanolamine) are particularly preferred. However, this cannot be said without being qualified because the amount and kind of this compound may vary according to, for example, the dye to be used.

As examples of tertiary amines, derivatives thereof, and complexes thereof, useful in the practice of the present invention, may be mentioned the compounds of the general formula $$R_3-Z-N-R_4 \atop {\phantom{R_3-Z-N-}| \atop \phantom{R_3-Z-N-}R_5}$$ (II)

wherein $R_3$ denotes an alkyl group having 1 to 48 carbon atoms, or hydrogen, $R_4$ denotes $(CH_2)_a-X_1$ or hydrogen, in which a is an integer of 1 to 4, $R_5$ denotes $(CH_2)_b-X_2$, $R_6-Y$ or hydrogen, in which b is an integer of 1 to 4, $R_6$ denotes an alkyl group having 1 to 48 carbon atoms, or hydrogen, Z denotes $(NR_7C_lH_{2l})_c(NHC_nH_{2n})_d$, in which l and n are independently an integer of 2 to 4, and c+d is an integer of 0 to 50, Y denotes $(NR_8C_mH_{2m})_e(NHC_pH_{2p})_f$, in which m and p are independently an integer of 2 to 4, and e+f is an integer of 0 to 50, $R_7$ denotes $(CH_2)_g-X_3$, in which g is an integer of 1 to 4, $R_8$ denotes $(CH_2)_h-X_4$, in which h is an integer of 1 to 4, and $X_1$, $X_2$, $X_3$ and $X_4$ are independently selected from the group consisting of a carboxyl group, a salt of the carboxyl group, a sulfonic group, a salt of the sulfonic group and a hydrogen atom, with a proviso that when $R_4$ and $R_5$ are both hydrogen, c and e are not 0 at the same time, and $X_1$, $X_2$, $X_3$ and $X_4$ do not denote hydrogen at the same time; of the general formula $$NH_2(C_jH_{2j}NH)_qH$$ (i)

wherein j and q are integers of 1 to 4 and 1 to 6, respectively; and of the general formula $$C_kH_{2k+1}NH(C_sH_{2s}NH)_uH$$ (ii)

wherein k, s and u are integers of 1 to 48, 1 to 4 and 0 to 5, respectively.

Of these compounds, particularly preferred compounds are specifically mentioned below.

| | |
|---|---|
| $NH_2C_2H_4NH_2$, | (Compound 1) |
| $NH_2(C_2H_4NH)_2H$, | (Compound 2) |
| $NH_2(C_2H_4NH)_3H$, | (Compound 3) |
| $NH_2(C_2H_4NH)_4H$, | (Compound 4) |
| $NH_2CH_2COOH$, | (Compound 5) |
| $NH_2C_2H_4NHCH_2SO_3H$, | (Compound 6) |
| $NH_2(C_2H_4NH)_2CH_2COOH$, | (Compound 7) |
| $NH_2(C_2H_4NH)_3CH_2COOH$, | (Compound 8) |
| $C_4H_9NHC_2H_4NH_2$, | (Compound 9) |
| $C_6H_{13}NH_2$, | (Compound 10) |
| $C_8H_{17}NH(C_2H_4NH)_2$, | (Compound 11) |
| $C_8H_{17}NHC_3H_6NH_2$, | (Compound 12) |
| $C_{12}H_{25}NHC_3H_6NH_2$, | (Compound 13) |

$$C_{18}H_{37}(NHC_2H_4)_4N{\begin{matrix}\diagup CH_2COONa \\ \diagdown CH_2COONa\end{matrix}},$$ (Compound 14)

$$C_{15}H_{31}(NHC_2H_4)_2N{\begin{matrix}\diagup CH_2COOLi \\ \diagdown CH_2COOLi\end{matrix}},$$ (Compound 15)

$$C_{15}H_{31}(NHC_2H_4)N{\begin{matrix}\diagup CH_2COOH.N(CH_2CH_2OH)_3 \\ \diagdown CH_2COOH.N(CH_2CH_2OH)_3\end{matrix}},$$ (Compound 16)

$$C_{16}H_{33}NHC_2H_4N{\begin{matrix}\diagup CH_2COONa \\ \diagdown CH_2COONa\end{matrix}},$$ (Compound 17)

$$C_{12}H_{25}N{\begin{matrix}\diagup C_2H_4COONa \\ \diagdown C_2H_4COONa\end{matrix}},$$ (Compound 18)

$$C_{48}H_{97}(NHC_2H_4)_3N{\begin{matrix}\diagup CH_2COONa \\ \diagdown CH_2COONa\end{matrix}},$$ (Compound 19)

| | |
|---|---|
| $C_{15}H_{31}(NHC_2H_4)_2NHCH_2COONa$, | (Compound 20) |
| $C_{15}H_{31}NHC_2H_4COOLi$, | (Compound 21) |
| $C_3H_7(NHC_2H_4)_2NHCH_2COONa$, | (Compound 22) |
| $C_{12}H_{25}NHC_2H_4COONa$, | (Compound 23) |
| $C_{12}H_{25}(NHC_2H_4)NHCH_2COOLi$, | (Compound 24) |
| $C_{12}H_{25}(NHC_2H_4)NHC_2H_4SO_3Li$, | (Compound 25) |
| $C_{15}H_{31}(NHC_2H_4)NHCH_2SO_3Na$, | (Compound 26) |
| $C_{20}H_{41}(NHC_2H_4)NHCH_2SO_3NH_4$, | (Compound 27) |
| $C_{15}H_{31}(NHC_2H_4)_2NHC_2H_4COONH_4$, | (Compound 28) |
| $C_{25}H_{51}(NHC_2H_4)_3NHCH_2SO_3Li$, | (Compound 29) |
| $C_{15}H_{31}(NHC_2H_4)NHCH_2SO_3H.N(CH_2CH_3)_3$, | (Compound 30) |
| $C_{10}H_{21}(NHC_2H_4)_3NHC_2H_4COOH.N(CH_2CH_2)_2$, | (Compound 31) |
| $C_{12}H_{25}(NHC_2H_4)_2NHCH_2COONH_4$, | (Compound 32) |
| $C_5H_{11}(NHC_2H_4)_2NHCH_2COONa$, | (Compound 33) |
| $C_7H_{15}(NHC_2H_4)_2C_2H_4COONa$, | (Compound 34) |
| $C_{12}H_{25}(NHC_2H_4)_4NHCH_2COONa$, | (Compound 35) |

$$\begin{matrix}C_8H_{17}NHC_2H_4NHC_2H_4\diagdown \\ \phantom{C_8H_{17}NHC_2H_4NHC_2H_4}N.CH_2COONa, \\ C_8H_{17}NHC_2H_4NHC_2H_4\diagup\end{matrix}$$ (Compound 36)

$$\begin{matrix}C_5H_{11}NHC_2H_4\diagdown \\ \phantom{C_5H_{11}NHC_2H_4}NC_2H_4COONa, \\ C_5H_{11}NHC_2H_4\diagup\end{matrix}$$ (Compound 37)

-continued $C_{12}H_{25}NHC_3H_6NHCH_2COONH_4$, (Compound 38)

$C_{12}H_{25}NHC_3H_6NHCH_2COONa$, (Compound 39)

$C_8H_{17}N(CH_3)C_2H_4N(CH_3)C_2H_4NHC_2H_4COONa$, (Compound 40)

$C_{12}H_{25}NHC_3H_6N(CH_3)C_2H_4COOLi$, (Compound 41)

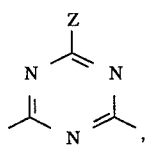  and (Compound 42)

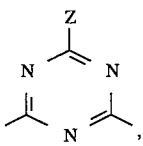 (Compound 43)

Particularly suitable compounds are those of the general formula (II) represented by (Compound 14) through (Compound 43).

The content of the compounds used in the present invention, such as those described above, in the ink is preferably within a range of from 0.01 to 20% by weight, more preferably from 0.1 to 10.0% by weight though it may vary depending entirely on the application and purpose of the ink, the kind of a coloring material used, and the composition of the ink.

No particular limitation is imposed on the coloring material used in the ink according to the present invention, and various kinds of coloring materials such as dyes and pigments may hence be used.

Among these coloring materials, taking the easiness of formation of ink and the stability of ink into consideration, for example, acid dyes, basic dyes and direct dyes are easy to use. Particularly useful coloring materials are direct dyes. Particularly preferred are direct dyes having a sulfonic group. The direct dyes may preferably have a nitrogen atom on a site other than a divalent organic linking group.

Of these coloring materials, dyes having at least an amino group or a cyclic group forming a 5- or 6-membered ring together with at least one nitrogen atom are particularly preferred.

More specifically, examples of the above-described coloring materials may include C.I. Direct Black 168, C.I. Direct Black 154, C.I. Direct Yellow 142, C.I. Direct Yellow 86, C.I. Direct Red 227, C.I. Direct Blue 199, and coloring materials represented by the following general formulas (III) and (IV) (in the form of a free acid). However, the coloring materials are not limited to these compounds.

$$Pc(SO_3H)_v(SO_2-NR^1-L-NR^2-X-NR^3-G)_w \quad (III)$$

wherein Pc denotes a metal-containing phthalocyanine ring, $R^1$, $R^2$ and $R^3$ denote independently H, an alkyl group, a substituted alkyl group, an alkenyl group, a substituted alkenyl group, an aralkyl group or a substituted aralkyl group, L denotes a divalent organic linking group, X denotes a carbonyl group, or a group of the formula

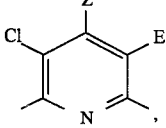 (2)

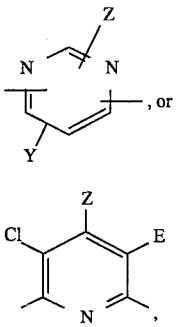 (3)

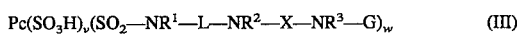 (4)

in which Z denotes $NR^4R^5$, $SR^6$ or $OR^6$, Y denotes H, Cl, Z, $SR^7$ or $OR^7$, E denotes Cl or CN, and $R^4$, $R^5$, $R^6$ and $R^7$ are independently H, an alkyl group, a substituted alkyl group, an aryl group, a substituted aryl group, an aralkyl group or a substituted aralkyl group, or $R^4$ and $R^5$ may form a 5- or 6-membered ring together with the nitrogen atom, G denotes a colorless organic residue substituted by one or two COSHs or COOHs, and v+w is an integer of 3 or 4.

An exemplary compound of the general formula (III) may include the compound of the formula

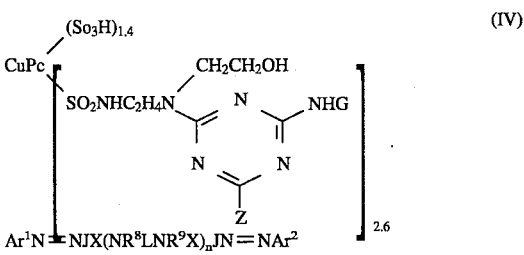 (IV)

wherein J denotes a radical of the formula

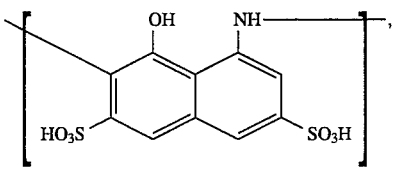

$Ar^1$ and $Ar^2$ denote independently an aryl group or a substituted aryl group, and at least one of $Ar^1$ and $Ar^2$ has at least one substituent group selected from COOH and COSH, $R^8$ and $R^9$ denote independently H, an alkyl group, a substituted alkyl group, an alkenyl group or a substituted alkenyl group, L denotes a divalent organic linking group, n is 0 or 1, X denotes a carbonyl group, or a group of the formula -continued

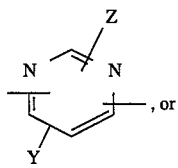
, or

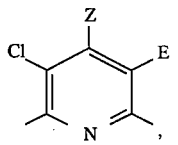

in which Z denotes NR$^{10}$R$^{11}$, SR$^{12}$ or OR$^{12}$, Y denotes H, Cl, Z, SR$^{13}$ or OR$^{13}$ E denotes Cl or CN, and R$^{10}$, R$^{11}$, R$^{12}$ and R$^{13}$ are independently H, an alkyl group, a substituted alkyl group, an alkenyl group, a substituted alkenyl group, an aryl group, a substituted aryl group, an aralkyl group or a substituted aralkyl group, or R$^{10}$ and R$^{11}$ may form a 5- or 6-membered ring together with the nitrogen atom, the compound represented by the formula (IV) having groups selected from COOH and COSH by at least the same number as that of SO$_3$H.

Specific examples of the compound represented by the general formula (IV) may include the following compounds of the formulas

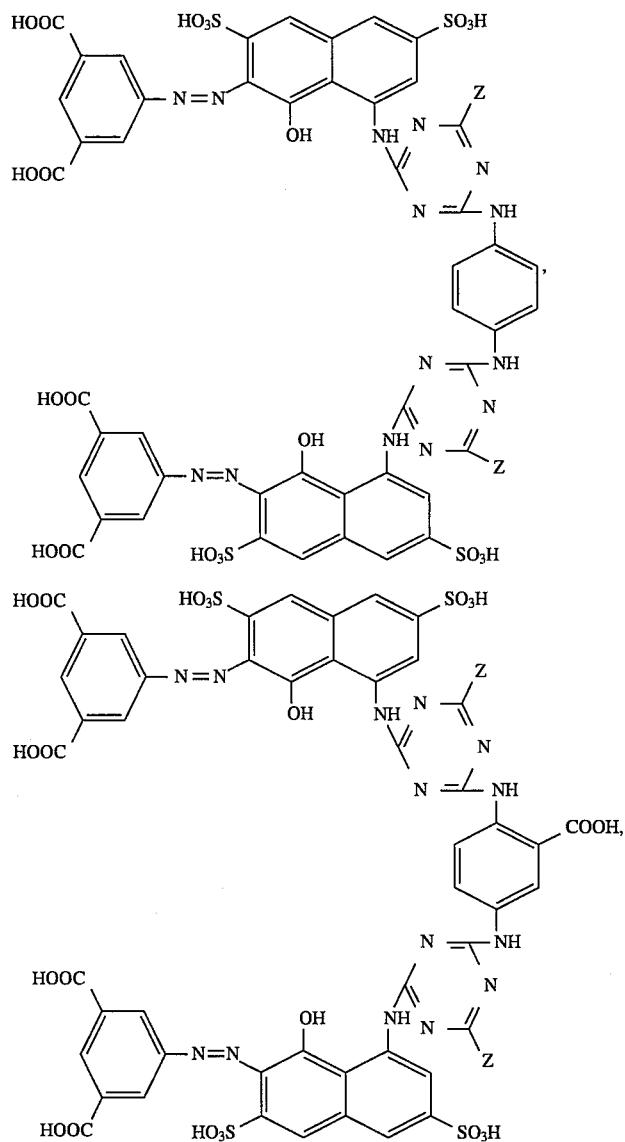

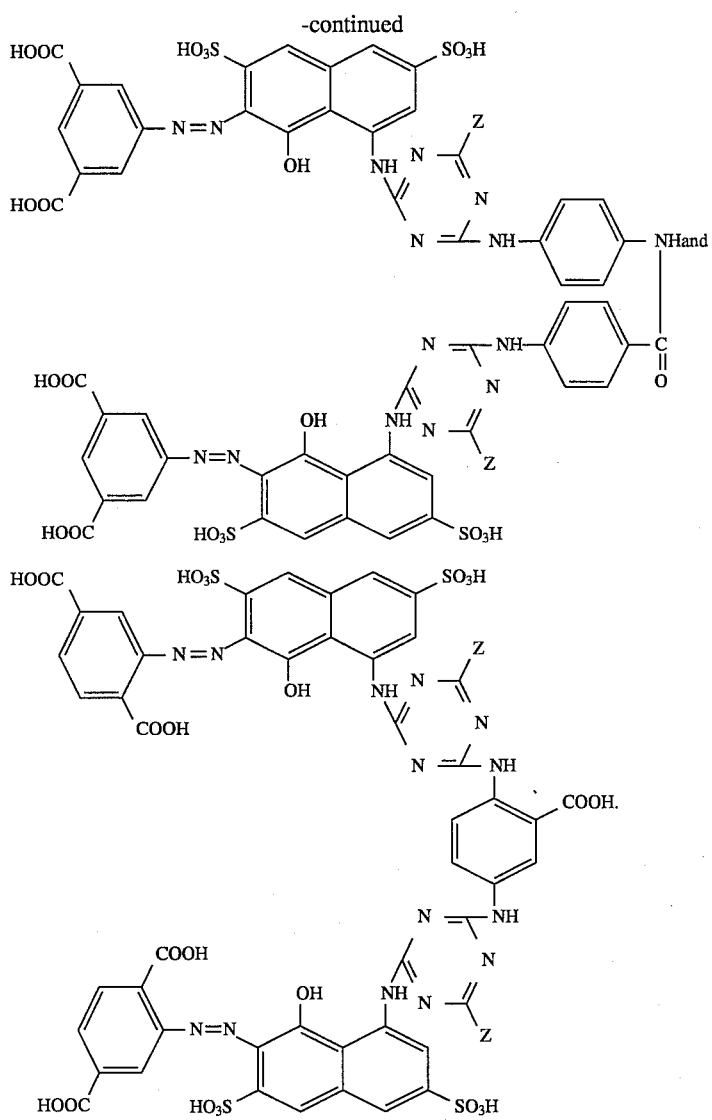

No particular limitation is imposed on the amount of the above-described coloring materials to be used. However, it is preferable to use them in a range of, generally, from 0.1 to 15% by weight, more preferably, from 0.1 to 10% by weight based on the total weight of the ink.

If a pH adjustor is added to the ink according to the present invention, it is preferable to adjust the pH of the ink to more alkaline side (9 or higher) than that at the maximum viscosity peak of the ink, in particular, if the ink is desired to have better recordability.

As the pH adjustor, various basic or acidic components may be used. Volatile basic components such as ammonia and amines are particularly preferred. Sulfuric acid, acetic acid, hydrochloric acid or the like can be used if an acidic component is used.

The inks of the present invention may contain, in addition to the above components, various additives such as water-soluble organic solvents, surfactants, rust preventives, antiseptics, mildewproofing agents, antioxidants, reduction inhibitors, vaporization accelerators, chelating agents and water-soluble polymers as necessary.

The liquid medium useful in the practice of this invention is preferably a mixed solvent of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; cyclic amide compounds such as 2-pyrrolidone and $\epsilon$-caprolactam; imide compounds such as succinimide; and the like.

The content of the water-soluble organic solvent in the ink is preferably within a range of, generally, from 1% to 40% by weight, more preferably, from 3% to 30% by weight based on the total weight of the ink.

The content of water to be used in the ink is within a range from 30 to 95% by weight. When the amount of water is less than 30% by weight, the solubility of the coloring material and the like is decreased, and the viscosity of the resulting ink is increased. It is hence not preferable to use water in such a small amount. On the other hand, when the amount of water is greater than 95% by weight, the vaporizing components are too great to satisfy sufficient crusting property.

The inks according to the present invention are particularly suitable for use in an ink-jet recording system of a type where an ink is ejected by the bubbling phenomenon of the ink caused by thermal energy. This recording system has a feature that the ejection of the ink becomes extremely stable, and no satellite dots are generated. In this case, the thermal properties (for example, the specific heat, the coefficient of thermal expansion, the heat conductivity, etc.) of the inks may however be controlled in some cases.

The inks according to the present invention are desirably controlled so as to have, as their own physical properties, a surface tension of 30 to 68 dyne/cm and a viscosity of 15 cP or lower, preferably 10 cP or lower, more preferably 5 cP or lower as measured at 25° C. from the viewpoint of solving the problem of water fastness of recorded images when recorded on plain paper or the like and at the same time, making the matching of the inks with a head for ink-jet recording good.

Accordingly, in order to control the physical properties of the inks to the above-described values and solve the problem on plain paper, it is preferred that the content of water in the inks of the present invention be adjusted to from not less than 50% to not more than 98% by weight, preferably, from not less than 60% to not more than 95% by weight.

The inks according to the present invention may suitably be used, in particular, in an ink-jet recording system of a type that recording is conducted by ejecting droplets of an ink by the action of thermal energy. However, the inks may also be used for general-purpose writing utensils.

As preferred methods and apparatus for conducting recording by using the inks according to the present invention, it may be mentioned that a method and apparatus in which thermal energy corresponding to recording signals is applied to an ink within a recording head, and ink droplets are generated in accordance with the thermal energy may be employed.

Figure 2:
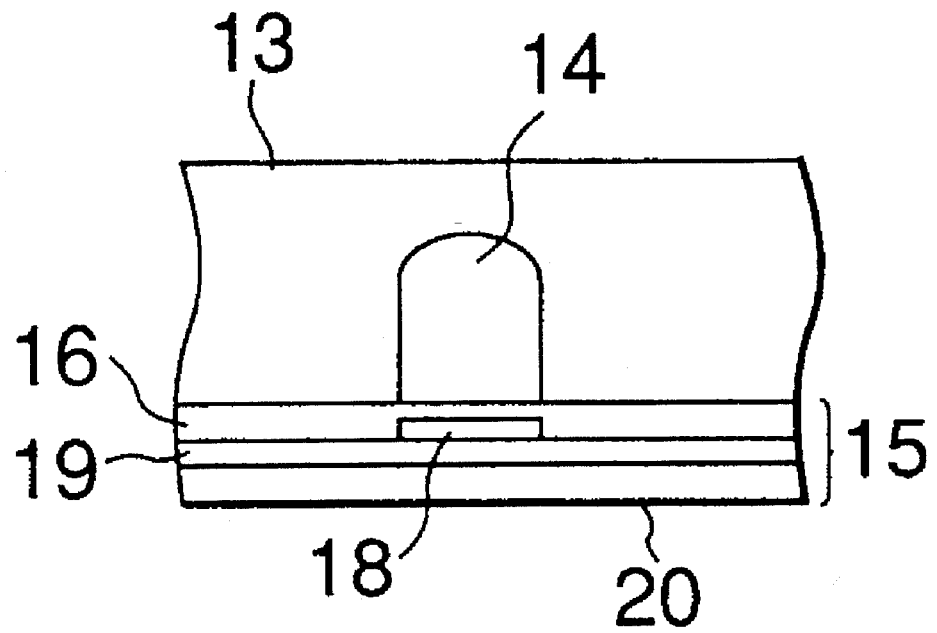
FIG. 2 is a transverse cross-sectional view of the head of the ink-jet recording apparatus.
Figure 3:
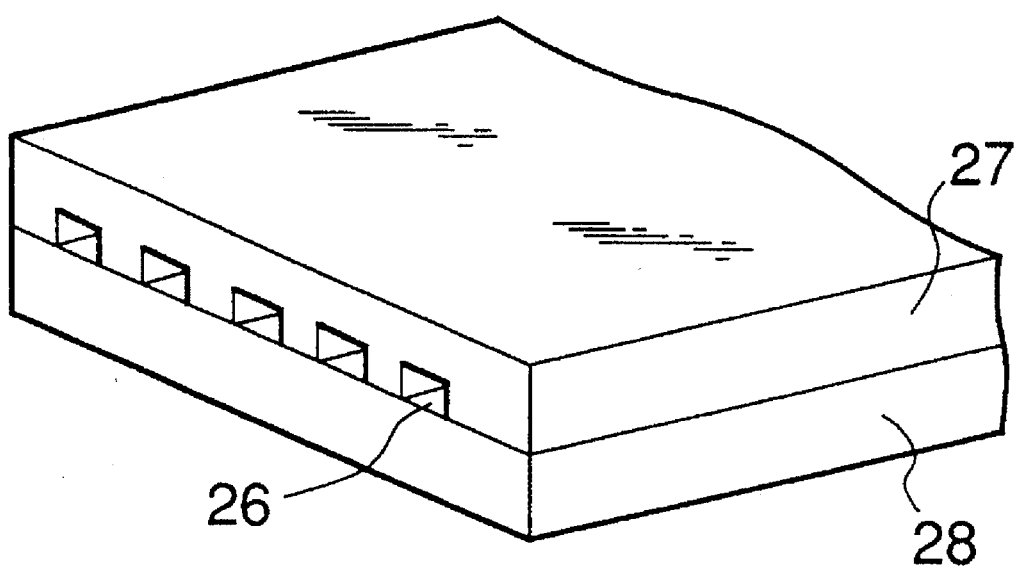
FIG. 3 is a perspective view of the appearance of a multi-head which is an array of such heads as shown in FIG. 1.

Examples of the construction of a head, which is a main component of such an apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawing shows a head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having good heat radiating properties.

An ink 21 comes up to an ejection orifice (a minute opening) 22 and forms a meniscus 23 owing to a pressure P.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24.

FIG. 3 illustrates the appearance of a multi-head composed of an array of a number of heads as shown in FIG. 1. The multi-head is formed by closely bonding a glass plate 27 having a number of grooves 26 to a heating head 28 similar to the head as illustrated in FIG. 1. Incidentally, FIG. 1 is a cross-sectional view of the head 13 taken along the flow path of the ink, and FIG. 2 is a cross-sectional view taken along line 2—2' in FIG. 1.

Figure 4:
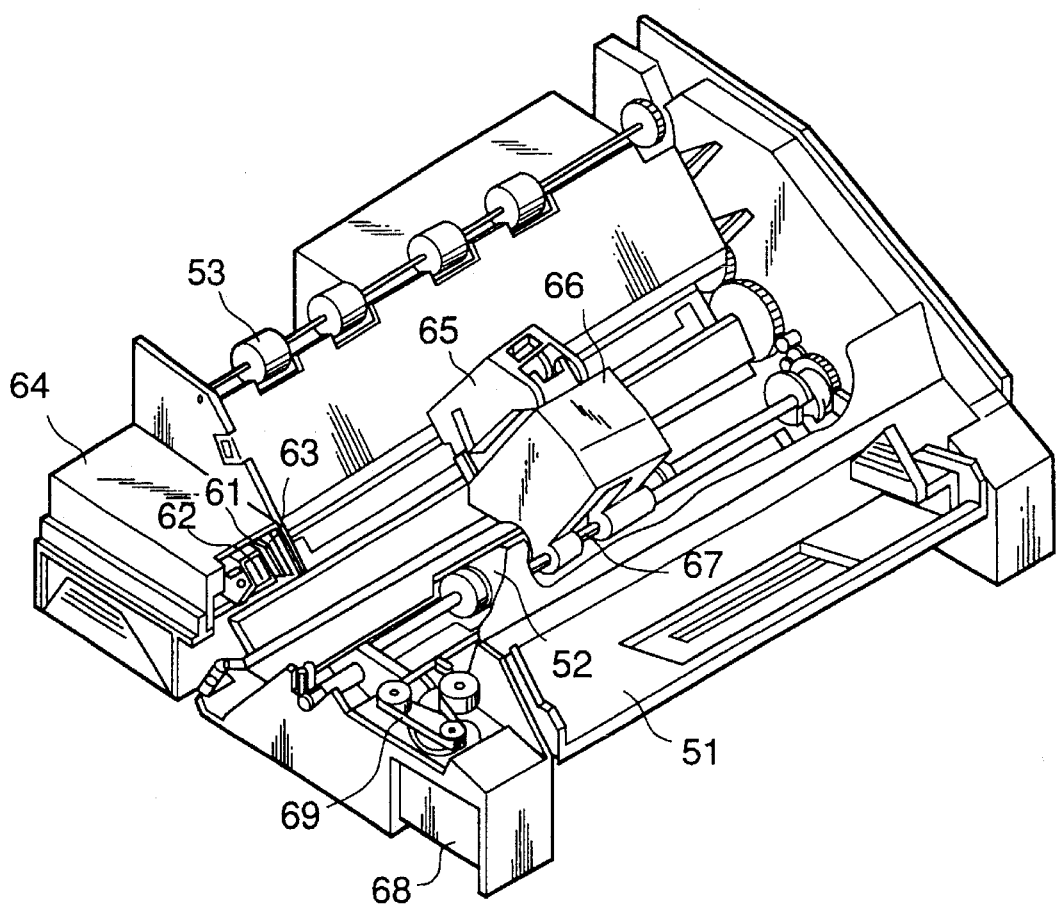
FIG. 4 is a perspective view of an illustrative ink-jet recording apparatus.

FIG. 4 illustrates an example of an ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such a construction, the recording material is fed to the position opposite to the ejection opening face of the recording head, and discharged from a paper discharge section provided with paper discharge rollers 53 with the progress of recording.

In the above construction, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
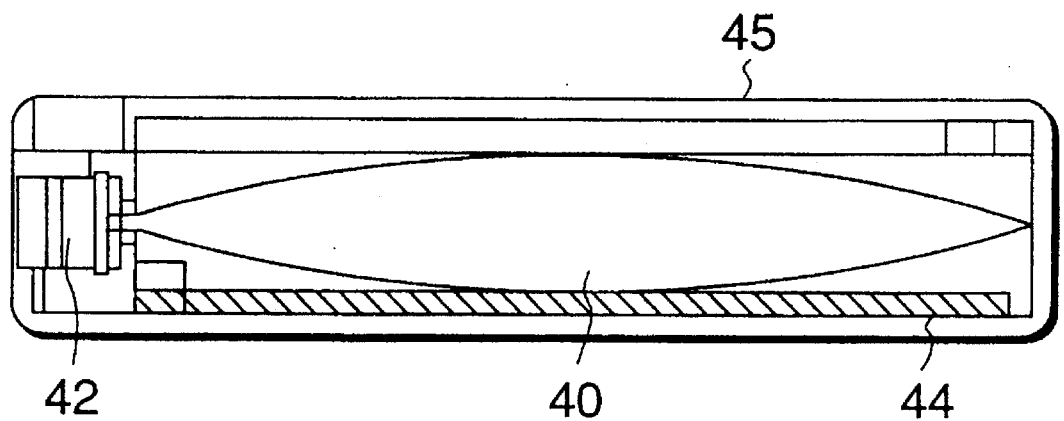
FIG. 5 is a longitudinal cross-sectional view of an ink cartridge.

FIG. 5 illustrates an exemplary ink cartridge in which an ink fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving waste ink. It is preferred in the present invention that the ink container portion is formed of a polyolefin, in particular, polyethylene, at its surface with which the ink comes into contact. The ink-jet recording apparatus used in this invention may not be limited to the apparatus as described above in which the head and the ink cartridge are separately provided. Therefore, a device in which these members are integrally formed as shown in FIG. 6 can also be preferably used.

Figure 6:
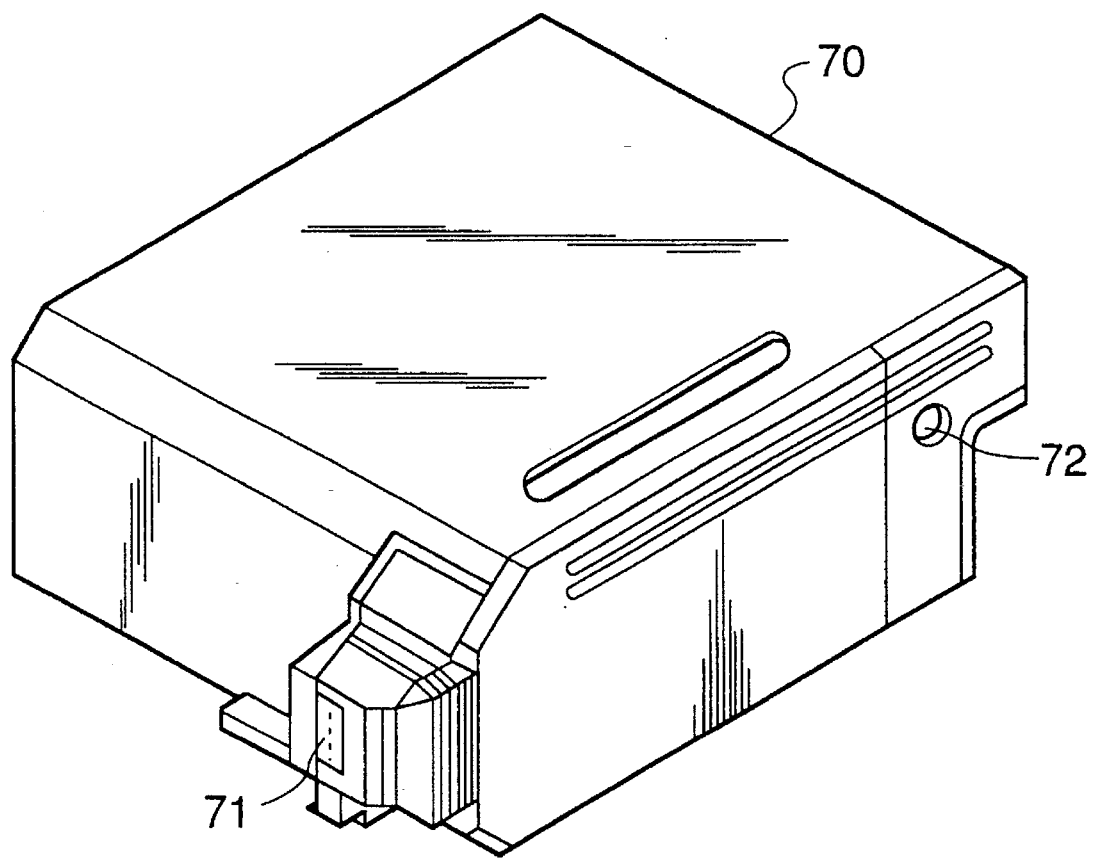
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane, cellulose or polyvinyl acetal is preferably used as a material for the ink-absorbing member. Reference numeral 72 indicates an air passage for communicating the interior of the recording unit 70 with the atmosphere. This recording unit 70 can be used in place of the recording head 65 shown in FIG. 4, and is detachably installed on the carriage 66.

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLES 1 TO 8:

After their corresponding components as described below were mixed and thoroughly stirred into solutions, the resulting solutions were separately filtered under pressure through a "Fluoropore Filter" (trade name; product of Sumitomo Electric Industries, Ltd.) having a pore size of 0.45 μm, thereby preparing respective inks according to Examples 1 to 8 of the present invention. The pH-value of each ink was adjusted to about 9.5 with a salt component of the respective compound.

(Example 1)

| | |
|---|---|
| C.I. Direct Black 168 | 2 parts |
| Thiodiglycol | 10 parts |
| Compound 31 | 2.5 parts |
| Ammonium nitrobenzenesulfonate | 2 parts |
| Water | 83.5 parts |

(Example 2)

| | |
|---|---|
| C.I. Direct Black 168 | 2.5 parts |
| 2-Pyrrolidone | 10 parts |
| Compound 34 | 4 parts |
| Sodium nitrobenzoate | 1.5 parts |
| Water | 82 parts |

(Example 3)

| | |
|---|---|
| C.I. Direct Black 168 | 2 parts |
| Thiodiglycol | 10 parts |
| Isopropyl alcohol | 4 parts |
| Compound 14 | 4 parts |
| Sodium nitrobenzenesulfonate | 2 parts |
| Water | 78 parts |

(Example 4)

| | |
|---|---|
| C.I. Direct Red 227 | 2 parts |
| Diethylene glycol | 5 parts |
| Thiodiglycol | 5 parts |
| Compound 33 | 4.5 parts |
| Sodium nitrobenzenesulfonate | 2 parts |
| Water | 81.5 parts |

(Example 5)

| | |
|---|---|
| C.I. Direct Black 168 | 2 parts |
| C.I. Food black 1 | 1 part |
| Thiodiglycol | 10 parts |
| Ethanol | 4 parts |
| Compound 28 | 4 parts |
| Monoethanolamine nitrobenzenesulfonate | 1.5 parts |
| Water | 77.5 parts |

(Example 6)

| | |
|---|---|
| C.I. Direct Blue 199 | 2 parts |
| Dipropylene glycol | 10 parts |
| Acetic acid salt of Compound 13 | 5 parts |
| Sodium benzenesulfonate | 2 parts |
| Water | 81 parts |

(Example 7)

| | |
|---|---|
| C.I. Direct Yellow 86 | 2 parts |
| Diethylene glycol | 10 parts |
| Compound 7 | 5 parts |
| Triethanolamine benzoate | 2.5 parts |
| Water | 80.5 parts |

(Example 8)

| | |
|---|---|
| C.I. Food Black 1 | 3 parts |
| 2-Pyrrolidone | 5 parts |
| Thiodiglycol | 5 parts |
| Compound 4 | 4 parts |
| Aminobenzoic acid | 1.0 part |
| Water | 82 parts |

Comparative Examples 1 to 4:

In the compositions of Examples 1 to 4, their corresponding compounds represented by the general formulas (I) and (II) were omitted, and instead, the same amount of water was supplied to prepare respective inks according to Comparative Examples 1 to 4.

Comparative Example 5:

In the composition of Example 5, monoethanolamine nitrobenzenesulfonate was omitted, and instead, the same amount of water was supplied to prepare an ink according to Comparative Example 5.

Comparative Example 6:

In the composition of Example 6, sodium benzenesulfonate was omitted, and instead, the same amount of water was supplied to prepare an ink according to Comparative Example 6.

Comparative Example 7:

In the composition of Example 7, triethanolamine benzoate was omitted, and instead, the same amount of water was supplied to prepare an ink according to Comparative Example 7.

Comparative Example 8:

In the composition of Example 8, aminobenzoic acid was omitted, and instead, the same amount of water was supplied to prepare an ink according to Comparative Example 8.

Using each of the inks obtained in Examples 1 to 8 and Comparative Examples 1 to 8, a printing test was conducted using, as an ink-jet recording apparatus, an On-Demand type ink-jet printer making use of a heating element as an ejection-energy source to evaluate the ink in (1) water fastness, (2) frequency response characteristic, (3) print quality, (4) storage stability and (5) variation in image density in accordance with the following respective standards. The results are shown in Tables 1 and 2.

Incidentally, the above-described ink-jet recording apparatus was operated under the following printing conditions:

Drive voltage: 26 V,
Resistance of a heating resistor: 150 Ω, and
Frequency: 4 kHz.

[Methods and Standards for Evaluation]

(1) Water fastness:

After an ink to be tested was charged into the printer to print English characters and numerals and solid print areas on (A) commercially-available acid paper and (B) commercially-available neutralized paper, the printer was stopped and the resulting print samples were allowed to stand for at least 1 hour, followed by measurement of the image density of the prints by a "Macbeth RD915" (trade name; manufactured by Macbeth Company). After the print samples were then immersed for 3 minutes in a container filled with water, they were allowed to stand and dry to measure their image density again, whereby the percent retention of the image density was calculated. The water fastness was evaluated by ranking the value in accordance with the following standard:

A: Percent retention of image density not lower than 80%;
B: Percent retention of image density ranging from 66% to 79%;
C: Percent retention of image density not higher than 65.

(2) Frequency response characteristic:

A resulting print sample was observed by naked eyes with respect to its printing conditions, namely, conditions of blurred characters and blank areas, and defective ink-droplet impact such as splash and slippage to evaluate the ink in the frequency response characteristic by ranking the conditions in accordance with the following standard:

A: The follow-up condition of the ink to the frequency was substantially good, and no characters blurred, blank areas and defective ink-droplet impact were observed upon printing of characters, but blur was slightly recognized upon solid printing;
B: No blurred characters and blank areas were observed, but defective ink-droplet impact was partly recognized upon printing of characters, and upon solid printing, blur and blank areas were observed at portions of about one-third of the whole solid printed area;
C: Blur and blank areas were observed to a great extent upon solid printing, and blurred characters and defective ink-droplet impact were also recognized to a large extent upon printing of characters.

(3) Evaluation of print quality:

English characters and numerals were printed on (A) commercially-available acid paper and (B) commercially-available neutralized paper by the printer, and the resulting print samples were left over for at least 1 hour. The print samples were then observed by a microscope and naked eyes to evaluate the ink in the print quality by ranking the degrees of sharpness of the letters and whisker-like feathering occurring on the letters in accordance with the following standard:

AA: The letters were sharp, and no whisker-like feathering occurred;
A: The letters were sharp, but whisker-like feathering slightly occurred;
B: The letters were dull, or whisker-like feathering occurred to a relatively great extent;
C: The letters were dull, and whisker-like feathering also occurred to a great extent.

(4) Storage stability:

An ink sample was placed in a bottle and hermetically sealed therein to leave it over 6 months in an environment controlled at 70° C. Thereafter, the ink sample was filtered through filter paper to evaluate the ink in storage stability by observing whether agglomeration occurred or not by naked eyes and rank it in accordance with the following standard:

A: No agglomeration was recognized;
B: Agglomeration was slightly recognized;
C: Agglomeration was recognized to a great extent.

(5) Variation in image density:

A solid print area was printed on commercially-available acid paper sheets, and the resulting print samples were allowed to stand for at least 1 hour, followed by measurement of the image density of 20 prints by a "Macbeth RD915" (trade name; manufactured by Macbeth Company). The variation in image density was ranked in accordance with the following standard:

A: Variation in image density was within 0.10;
C: Variation in image density was greater than 0.10.

TABLE 1

| Item Evaluated | Results of evaluation Example | | | | | | | |
|---|---|---|---|---|---|---|---|---|
| | 1 | 2 | 3 | 4 | 5 | 6 | 7 | 8 |
| Water Resistance | | | | | | | | |
| (A) | A | A | A | A | A | A | A | B |
| (B) | A | A | A | A | A | A | B | B |
| Frequency response characteristic | A | A | A | A | A | A | A | A |
| Print quality | | | | | | | | |
| (A) | AA | AA | AA | AA | AA | AA | A | A |
| (B) | AA | AA | AA | AA | AA | AA | AA | AA |
| Storage stability | A | A | A | A | A | A | A | A |
| Variation in image density | A | A | A | A | A | A | A | A |

TABLE 2

| Item Evaluated | Results of evaluation Comparative Example | | | | | | | |
|---|---|---|---|---|---|---|---|---|
| | 1 | 2 | 3 | 4 | 5 | 6 | 7 | 8 |
| Water Resistance | | | | | | | | |
| (A) | C | C | C | C | A | A | A | B |
| (B) | C | C | C | C | A | A | B | B |
| Frequency response characteristic | A | A | A | A | A | A | A | A |
| Print quality | | | | | | | | |
| (A) | A | A | A | A | AA | AA | A | A |
| (B) | A | A | A | A | AA | AA | AA | AA |
| Storage stability | B | B | B | B | B | B | C | B |
| Variation in image density | C | C | C | C | C | C | A | A |

According to the present invention, as described above, there can be provided inks which can improve the water fastness of recorded images without adversely affecting their quality, and the like when conducting printing on so-called plain paper such as acid paper and neutralized paper, commonly used in offices and the like.

Further, the present invention can provide inks which are good in stability even after stored in a high-temperature environment and can conduct recording with high reliability without the least problem in an ink-jet recording system.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink comprising a coloring material and a liquid medium dissolving or dispersing the coloring material therein, wherein the ink contains in combination a compound of the general formula

wherein $R_1$ denotes hydrogen, a nitro group or an amino group, and $R_2$ denotes a carboxyl group, a sulfonic group, a phosphoric group or a salt thereof, and at least one compound selected from the group consisting of primary to tertiary amines, derivatives thereof, and complexes thereof.

2. The ink according to claim 1, wherein $R_1$ in the general formula (I) is a nitro group or an amino group.

3. The ink according to claim 1, wherein $R_2$ in the general formula (I) is a salt of a carboxyl group or a sulfonic group.

4. The ink according to claim 1, wherein $R_2$ in the general formula (I) is a salt of a carboxyl group or a sulfonic group with a volatile nitrogen-containing compound.

5. The ink according to claim 1, wherein said at least one compound selected from the group consisting of the primary to tertiary amines, derivatives thereof, and complexes thereof has at least one group selected from an alkyl group, a carboxyl group, a salt of the carboxyl group, a sulfonic group and a salt of the sulfonic group.

6. The ink according to claim 1, wherein said at least one compound selected from the group consisting of the primary to tertiary amines, derivatives thereof, and complexes thereof is a compound of the general formula

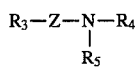

wherein $R_3$ denotes an alkyl group having 1 to 48 carbon atoms, or hydrogen, $R_4$ denotes $(CH_2)_a$—$X_1$ or hydrogen, in which a is an integer of 1 to 4, $R_5$ denotes $(CH_2)_b$—$X_2$, $R_6$—Y or hydrogen, in which b is an integer of 1 to 4, $R_6$ denotes an alkyl group having 1 to 48 carbon atoms, or hydrogen, Z denotes $(NR_7C_lH_{2l})_c(NHC_nH_{2n})_d$, in which l and n are independently an integer of 2 to 4, and c+d is an integer of 0 to 50, Y denotes $(NR_8C_mH_{2m})_e(NHC_pH_{2p})_f$, in which m and p are independently an integer of 2 to 4, and e+f is an integer of 0 to 50, $R_7$ denotes $(CH_2)_g13 X_3$, in which g is an integer of 1 to 4, $R_8$ denotes $(CH_2)_h$—$X_4$, in which h is an integer of 1 to 4, and $X_1$, $X_2$, $X_3$ and $X_4$ are independently selected from the group consisting of a carboxyl group, a salt of the carboxyl group, a sulfonic group, a salt of the sulfonic group and a hydrogen atom, with a proviso that when $R_4$ and $R_5$ are both hydrogen, c and e are not 0 at the same time, and $X_1$, $X_2$, $X_3$ and $X_4$ do not denote hydrogen at the same time.

7. The ink according to claim 6, wherein in the compound represented by the general formula (II), $X_1$, $X_2$, $X_3$ and $X_4$ are independently selected from the group consisting of salts of carboxyl and sulfonic groups, and a hydrogen atom.

8. The ink according to claim 6, wherein in the compound represented by the general formula (II), $X_1$, $X_2$, $X_3$ and $X_4$ are independently a salt of a carboxyl group or a sulfonic group with a volatile nitrogen-containing compound.

9. The ink according to claim 6, wherein in the compound represented by the general formula (II), $R_3$ and $R_6$ are independently an alkyl group having 1 to 32 carbon atoms, c+d and e+f are independently an integer of 0 to 16, and a, b, g and h are independently an integer of 1 or 2.

10. The ink according to claim 1, wherein the coloring material is a direct dye.

11. The ink according to claim 1, wherein the coloring material is a dye having at least one sulfonic group.

12. The ink according to claim 1, wherein the coloring material is a dye having a nitrogen atom on a site other than a divalent organic linking group.

13. The ink according to claim 1, wherein the pH of the ink is adjusted to 9 or higher.

14. An ink-jet recording method comprising ejecting droplets of an ink out of an orifice of a recording head in accordance with a recording signal to conduct recording on a recording material, wherein said ink is the ink as set forth in claim 1.

15. The ink-jet recording method according to claim 14, wherein the ink is ejected in the form of droplets by applying thermal energy to the ink.

16. A recording unit comprising an ink container portion with an ink held therein and a head from which the ink is ejected in the form of ink droplets, wherein said ink is the ink as set forth in claim 1.

17. The recording unit according to claim 16, wherein the head is a head which applies thermal energy to the ink to eject the ink in the form of droplets.

18. An ink cartridge comprising an ink container portion with an ink held therein, wherein said ink is the ink as set forth in claim 1.

19. An ink-jet recording apparatus comprising a recording unit having an ink container portion with an ink held therein and a head from which the ink is ejected in the form of ink droplets, wherein said ink is the ink as set forth in claim 1.

20. The ink-jet recording apparatus according to claim 19, wherein the head is a head which applies thermal energy to the ink to eject the ink in the form of droplets.

21. An ink-jet recording apparatus comprising a recording unit for ejecting an ink in the form of droplets, an ink cartridge having an ink container portion with the ink held therein, and an ink feeder for feeding the ink from the ink cartridge to the recording unit, wherein said ink is the ink as set forth in claim 1.

22. The ink-jet recording apparatus according to claim 21, wherein the recording unit has a head which applies thermal energy to the ink to eject the ink in the form of droplets.

* * * * *

UNITED STATES PATENT AND TRADEMARK OFFICE
CERTIFICATE OF CORRECTION

PATENT NO. : 5,478,383
DATED : December 26, 1995
INVENTOR(S) : AKIRA NAGASHIMA, ET AL.

It is certified that error appears in the above-indentified patent and that said Letters Patent is hereby corrected as shown below:

COLUMN 1:

Line 16, "researches" should read --research--; and

Line 17, "opments" should read --opment--.

COLUMN 4:

(Compound 31), "$(CH_2CH_2)_2,$" should read --$(CH_2CH_3)_2,$--.

COLUMN 15:

Line 49, "65." should read --65%.--.

COLUMN 18:

Line 31, "$(CH_2)_g13X_3,$" should read --$(CH_2)_g-X_3,$--.

Signed and Sealed this

Eighteenth Day of June, 1996

*Attest:*

BRUCE LEHMAN

*Attesting Officer*    Commissioner of Patents and Trademarks